United States Patent
Impson et al.

(10) Patent No.: US 7,415,613 B2
(45) Date of Patent: Aug. 19, 2008

(54) SYSTEM AND METHOD FOR DETECTING ALTERATION OF OBJECTS

(75) Inventors: Jeremy D. Impson, Vestal, NY (US);
Nader Mehravari, Ithaca, NY (US)

(73) Assignee: Lockheed Martin Corporation, Bethesda, MD (US)

(*) Notice: Subject to any disclaimer, the term of this patent is extended or adjusted under 35 U.S.C. 154(b) by 887 days.

(21) Appl. No.: 10/444,379

(22) Filed: May 23, 2003

(65) Prior Publication Data

US 2004/0001568 A1    Jan. 1, 2004

Related U.S. Application Data

(60) Provisional application No. 60/385,309, filed on Jun. 3, 2002.

(51) Int. Cl.
    *H04L 1/00*    (2006.01)
(52) U.S. Cl. .................... 713/176; 713/175
(58) Field of Classification Search .......... 430/179; 380/55; 713/175, 176
    See application file for complete search history.

(56) References Cited

U.S. PATENT DOCUMENTS

| | | | |
|---|---|---|---|
| 5,038,283 A | 8/1991 | Caveney | 364/403 |
| 5,050,212 A * | 9/1991 | Dyson | 713/187 |
| 5,153,842 A | 10/1992 | Dlugos, Sr. et al. | 364/478 |
| 5,469,363 A | 11/1995 | Saliga | 364/478 |
| 5,557,096 A | 9/1996 | Watanabe et al. | 235/492 |
| 5,787,400 A | 7/1998 | Weber | 705/1 |
| 5,838,759 A | 11/1998 | Armistead | 378/57 |
| 5,971,587 A | 10/1999 | Kato et al. | 364/468.22 |
| 5,974,150 A * | 10/1999 | Kaish et al. | 713/179 |
| 6,098,057 A | 8/2000 | Dlugos | 705/407 |
| 6,101,487 A | 8/2000 | Yeung | 705/410 |
| 6,192,101 B1 | 2/2001 | Grodzins | 378/55 |
| 6,275,745 B1 | 8/2001 | Critelli et al. | 700/227 |
| 6,294,997 B1 | 9/2001 | Paratore et al. | 340/572.1 |
| 6,298,013 B1 | 10/2001 | Berlin et al. | 368/10 |
| 6,304,856 B1 | 10/2001 | Soga et al. | 705/28 |

(Continued)

OTHER PUBLICATIONS

*The Electronic Product Code (EPC)—A Naming Scheme For Physical Objects*, David L. Brock, MIT Auto-ID Center, MIT, 77 Massachusetts Ave., Building 3-449G, Cambridge, MA 02139-4307, Published Jan. 1, 2001.

(Continued)

*Primary Examiner*—Kambiz Zand
*Assistant Examiner*—William S Powers
(74) *Attorney, Agent, or Firm*—Burns & Levinson LLP; Jacob N. Erlich; Kathleen Chapman

(57) ABSTRACT

A system and method for detecting if an object has been tampered with comprising a characterizer, a comparator, and indicator, and optionally, a signer. The characterizer generates a first digital characterization of an object at a first time and at least one subsequent digital characterization of the object at at least one subsequent time. The comparator compares the first digital characterization with the at least one subsequent digital characterization, and the indicator generates a pre-selected characterization signal if the first and subsequent digital characterizations don't match. Optionally, the first digital characterization can be accompanied by a first digital signature. The signer optionally verifies the digital signature at the at least one subsequent time.

17 Claims, 9 Drawing Sheets

U.S. PATENT DOCUMENTS

| | | | |
|---|---|---|---|
| 6,370,222 B1 * | 4/2002 | Cornick, Jr. | 378/57 |
| 2002/0071524 A1 | 6/2002 | Renkart et al. | 378/199 |
| 2003/0006878 A1 | 1/2003 | Chung | 340/5.25 |

OTHER PUBLICATIONS

*Wireless Internet-enabled Data Collection and Real-time Reporting System*, Biovigilance, Inc., SIRA Technologies, 3452 E. Foothill Blvd., #460, Pasadena, CA 91107, Copyright 2001.

*An Analysis of the Fundamental Constraints On Low Cost Passive Radio-Frequency Indentification System Design*, Tom A. Scharfeld, MIT Department of Mechanical Engineering, 77 Massachusetts Ave., Cambridge, MA 02139-4307, Published Aug. 2001.

*Towards the 5 ¢ Tag*, Sanjay Sarma, MIT Auto-ID Center, MIT, 77 Massachusetts Ave., Building 3-449G, Cambridge, MA 02139-4307, Published Nov. 1, 2001.

*How the EPC Network Will Automate the Supply Chain*, http://ww.autoidcenter.org/aboutthetech_idiotsguide.asp, Last updated 2002.

*Why Focus on Radio Frequency Identification?*, http://www.autoidcenter.org/aboutthetech_whyfocus.asp, Appears to have been last updated 2002.

*Providing Secure Transportation through a Global Wireless Data System*, Final Analysis Communication Services, Inc., 9701-E Philadelphia Court, Lanham, MD 20706-4400, Published Jan. 29, 2002.

*Auto-ID Based Control—An Overview*, Duncan McFarlane, MIT Auto-ID Center, MIT, 77 Massachusetts Ave., Building 3-449G, Cambridge, MA 02139-4307, Published Feb. 1, 2002.

*Turning the International Shipping Industry Into a WMD Delivery System: The Importance of Information and Intelligence for Prevention a nd Detection*, Anne-Marie Bruen and Douglas McDonald, Abt Associates, Cambridge, MA, Jul. 24, 2002.

U.S. Appl. No. 60/385,309, filed Jun. 3, 2002. Applicant: Jeremy D. Impson et al. Title: Automated alteration detection of physical goods.
Announcement of the Matrics RFID handheld reader, http://goliath.ecnext.com/coms2/gi_0199-2499598/Matrics-R-Introduces-First-in.html, Feb. 26, 2003.

How RFID Technology Can Enhance Your Asset Management Program, Copyright 2007 Infor Global Solutions GmbH.

* cited by examiner

SYSTEM AND METHOD FOR DETECTING ALTERATION OF OBJECTS

CROSS REFERENCE TO RELATED APPLICATIONS

The present application claims benefit of U.S. Provisional Application No. 60/385,309 filed Jun. 3, 2002, entitled AUTOMATED ALTERATION DETECTION OF PHYSICAL GOODS which is incorporated herein in its entirety by reference.

BACKGROUND OF THE INVENTION

The present invention relates generally to detection of alteration of physical goods, and specifically to automated detection when objects or the like have been altered between inspections.

There are major shortcomings in the traditional brute force approach of continuously monitoring the security of physical entities throughout the various stages of packaging, distribution, and transportation at origination, at intermediate points and times, and at the destination. Because of the amount of inspection and accounting required, manual approaches for continuous monitoring can only be performed properly on a small subset of objects. Of the more than 200,000 vessels and 11.6 million shipping containers passing through U.S. ports during 2000, fewer than 1% were physically inspected.

Current shipping inspection technology is, if exhaustive, invasive and time consuming. For example, 15 person-hours are required to properly inspect an 18-wheel tractor-trailer. Less exhaustive inspections that randomly sample shipping containers allow the potential for unwanted and dangerous cargo to pass. Targeted inspection mechanisms, such as a trained dog detecting drugs or explosives, miss the bigger picture—a narcotic-detecting dog may not be trained to detect all forms of explosives.

Similar situations occur during luggage check-in at airports. Even with recent airport security increases, luggage inspection and passenger screening occurs at random, providing a very low level of security assurance. Current use of invasive physical inspection of luggage and passengers is time consuming, intrusive, and potentially dangerous to screening personnel and nearby passengers. The use of X-rays is error prone and labor intensive.

At the same time, detection of both intentional and accidental alterations to physical goods during packaging, distribution, and transportation has become an ever-increasing concern for a wide-range of entities. This problem is of particular importance when the situation involves potential hazard to human life.

There appear to be no "smart" systems that allow streamlined repeated stationary or en-route inspections. Most conventional inspection systems make only one inspection (at departure for luggage and passengers, at the border for shipping). Furthermore, it appears that no inspection systems provide knowledge, such as travel route of the shipment, that can be trusted.

There appears to be no accepted mechanism to provide authentication for remote, upstream, or lapsed-time inspections. All inspections must be repeated at each port and periodically at the same port, because there appears to be no common way to quickly check for changes since the last inspection. Also, there appear to be no common mechanisms to generate a digital representation or "fingerprint" of a shipping item or person's being, one that can be quickly re-verified during subsequent inspections, thus reducing time consumed for these inspections. Current systems, such as X-ray machines, official inspectors, visible inspections, intrusive physical inspections, and chemical detection units (dogs or machines), provide partial solutions to the problem of security. However, none of these, separately or in combination, can verify the integrity of a objects or physical entities such as goods, shipments, and the like in a timely and non-invasive manner, nor simultaneously meet the needs of such business domains as transportation, manufacturing, packaging, and distribution.

A system is needed that automates the traditional brute force approach of continuously monitoring the security of physical entities throughout the various stages of packaging, distribution, and transportation at origination, at intermediate points, and at the destination. A system is needed that could transfer the burden and the complexity of proving the integrity of a shipment to the origination point of the shipment, while maintaining overall physical security. Further, a system is needed that quickly and non-intrusively allows repeated physical inspection of objects.

BRIEF SUMMARY OF THE INVENTION

The problems set forth above as well as further and other problems are solved by the present invention. These solutions and other advantages are achieved by the illustrative embodiments of the invention described hereinbelow.

The alteration detection system and method of the present invention apply the concepts of digital signatures and associated cryptographic and information security techniques to physical objects. The system includes a characterizer that generates a first digital characterization of the object at a first time and a subsequent digital characterization of the object at subsequent times (e.g. at border crossings, at times of reception, and/or at pre-determined or random time intervals). The system also includes a comparator that receives and compares the first digital characterization with the second digital characterization. The comparator generates a pre-selected characterization notification when the second digital characterization is substantially different from the first digital characterization. The system also includes an indicator that receives the pre-selected characterization notification and generates a pre-selected characterization signal that is, for example, used to alert authorities. Optionally, the system can include a signer that provides to the comparator a first cryptographic signature associated with the first digital characterization and a second cryptographic signature associated with the second digital characterization. The comparator determines whether the first cryptographic signature is identical to the second cryptographic signature and generates a pre-selected signature indication when the signatures aren't identical. The indicator receives the pre-selected signature indication and generates a pre-selected signature signal that is, for example, used to alert authorities.

The functional components of the system can include a digital characterization subsystem, a send subsystem, a receive subsystem, a comparison subsystem, and an alteration handling subsystem. Optionally, the system can include a digital signature subsystem. The digital signature subsystem insures that a digital signature remains with the shipment while the shipment is intact.

The digital characterization subsystem prepares a unique characterization for an object (this term includes items any types of physical entities, for example, objects that are part of a shipment, or the entire shipment itself). The optional digital signature subsystem is capable of allowing cryptographic signature of the digital fingerprint created by the digital characterization subsystem. The optional send and receive subsystems manage the sending and receiving of the physical entities and the digital fingerprint (and optional digital signature) to and from subsequent destination(s), should the shipment be in transit. The comparison subsystem compares the recomputed digital fingerprint for the object with original digital fingerprint. If the original and recomputed digital fingerprints are not substantially identical, the comparison subsystem invokes the alteration handling subsystem. Optionally, if a digital signature is involved, after the digital fingerprint is recomputed, but before the original digital fingerprint is compared to the recomputed digital fingerprint, the comparison subsystem verifies the digital signature. This extra step can protect the object, goods, shipment, etc. from intentional tampering. If the digital signature does not verify, the comparison subsystem invokes the alteration handling subsystem.

The alteration handling subsystem prepares a pre-selected characterization signal if the original digital fingerprint is not substantially identical to the recomputed digital fingerprint. Optionally, the alteration handling system prepares a preselected signature signal if the digital signature does not verify. The pre-selected signature signal can be used to alert either a local or remote operator of possible tampering. The digital signature is interpreted by subsequent destinations in order to detect intentional tampering. When detection of accidental alteration of the shipment is required, the digital signature isn't necessary.

The method of the present invention includes the steps of non-intrusively characterizing an object (either an item that is part of a shipment or the entire shipment) and generating, using characterization parameter(s) derived during the characterization, a unique entity identifier for the object at a first time. The method further includes the step of associating the unique entity identifier with the object and/or shipment. The method further includes the steps of recomputing the unique entity identifier(s) at subsequent times (e.g. at border crossings, times of reception, and/or at pre-determined or random time intervals) according to the characterization parameter, and comparing the original unique entity identifier with the recomputed unique entity identifier. If the original unique entity identifier isn't substantially identical to the recomputed unique entity identifier, the method next includes the step of generating a pre-selected characterization notification.

Optionally, to guard against intentional tampering, the method can include the steps of, at a first time, cryptographically signing the original unique entity identifier and appending the cryptographic signature to the original unique entity identifier. Further, the method can include the steps of, at a later time, verifying the cryptographic signature, and preparing a pre-selected signature notification if the cryptographic signature does not verify.

For a better understanding of the present invention, reference is made to the accompanying drawings and detailed description and its scope will be pointed out in the appended claims.

DETAILED DESCRIPTION OF THE INVENTION

The present invention is now described more fully hereinafter with reference to the accompanying drawings, in which the illustrative embodiment of the present invention is shown.

Figure 1:
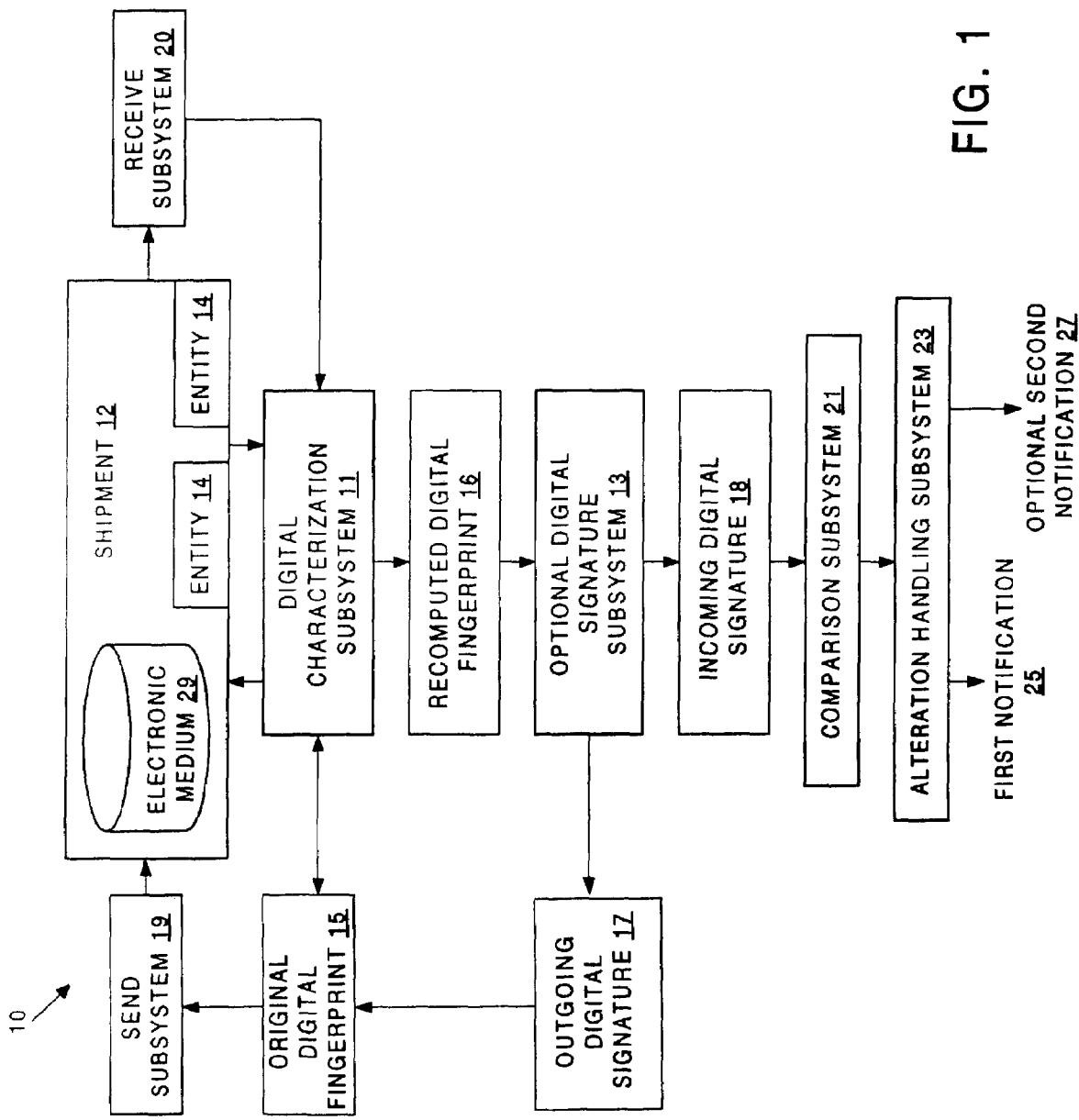
FIG. 1 is a schematic block diagram of the system of the present invention.

The system and method of the present invention include a framework for automated detection of both intentional and accidental alterations to objects (including physical goods, shipments, and the like) in transit and in storage via the application of digital codes. Referring to FIG. 1, alteration detection system 10 includes a digital characterization subsystem 11 (described in more detail hereinafter with respect to FIG. 3A) that prepares original 15 and recomputed 16 digital fingerprints for each object or entity 14 (physical goods, shipments, and the like) in shipment 12. Digital characterization subsystem 11 stores an original digital fingerprint 15 that it generates directly on electronic medium 29 or digital characterization subsystem 11 provides original digital fingerprint 15 to send subsystem 19 that associates shipment 12 and original digital fingerprint 15 on electronic medium 29. When the shipment 12 is again monitored, either by its arrival at receive subsystem 20 or after some time has passed (such as at a border crossing, at a time of reception, and/or at predetermined or random time intervals), digital characterization subsystem 11 prepares recomputed digital fingerprint 16 for each entity 14, and perhaps as well as for shipment 12. Comparison subsystem 21 determines if shipment 12 has been altered by comparing recomputed digital fingerprint 16 with original digital fingerprint 15. If shipment 12 has been altered, either intentionally or accidentally, the recomputed digital fingerprint 16 is not substantially identical to the original digital fingerprint 15, and comparison subsystem 21 invokes alteration handling subsystem 23. Alteration handling subsystem 23 (described hereinafter with respect to FIG. 4C) is utilized to prepare a first notification 25, a pre-selected characterization signal, when the fingerprints aren't substantially identical. Alteration handling subsystem 23 prepares an optional second notification 27, a pre-selected signature signal, if outgoing digital signature 17, that has been prepared by the optional digital signature subsystem 13 (described hereinafter with respect to FIG. 4A), isn't substantially identical to incoming digital signature 18.

Continuing to refer to FIG. 1, after the original digital fingerprint 15 is computed, either digital characterization subsystem 11 or send subsystem 19 saves it on electronic medium 29 along with an indication of the method used to compute the original digital fingerprint 15 and any supporting data necessary, such as the characteristics that were measured and the deterministic function that was used to prepare the fingerprint. If shipment 12 is in transit, send subsystem 19 transmits these data to any subsequent receive subsystem 20.

Figure 2A:
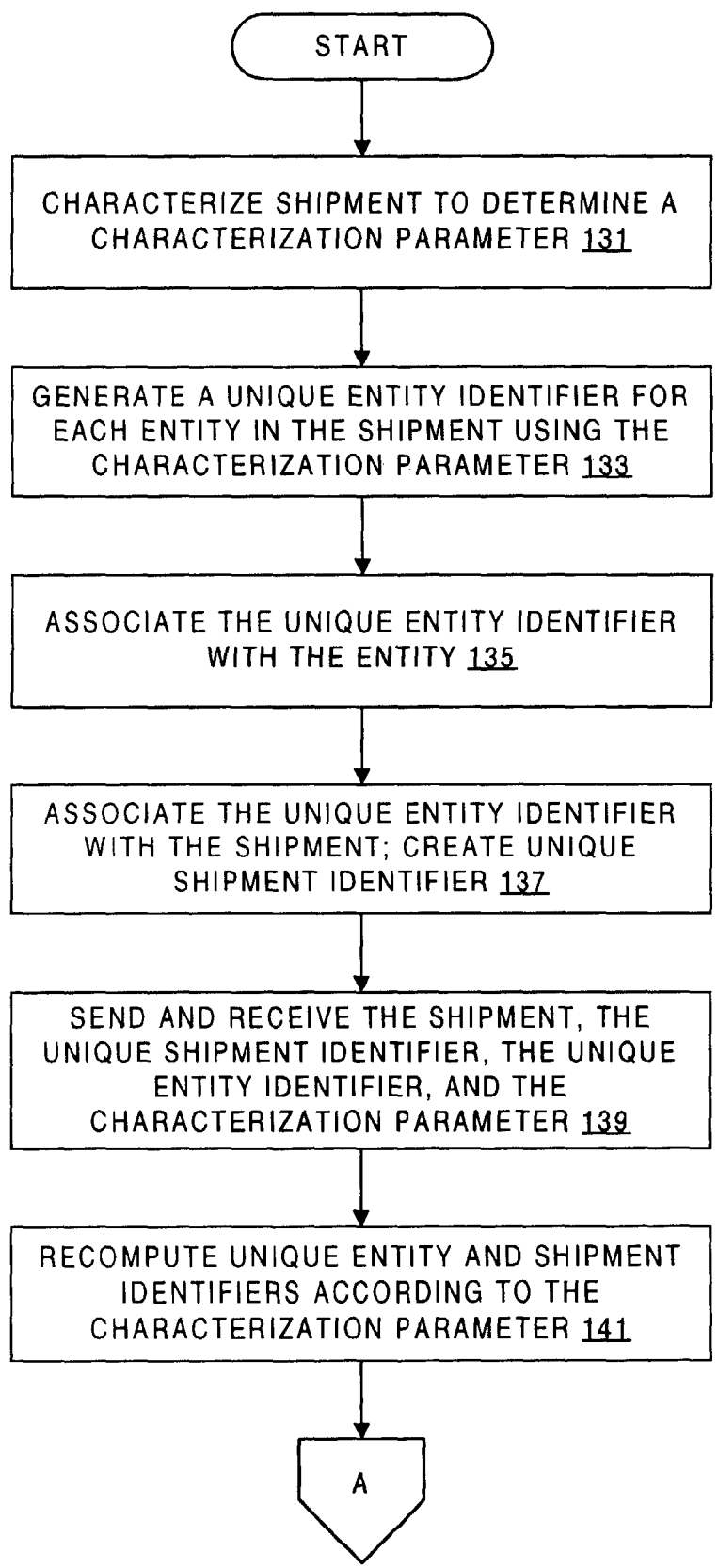
FIGS. 2A-B is a flow diagram of the illustrative embodiment of the method of the present invention.
Figure 2B:
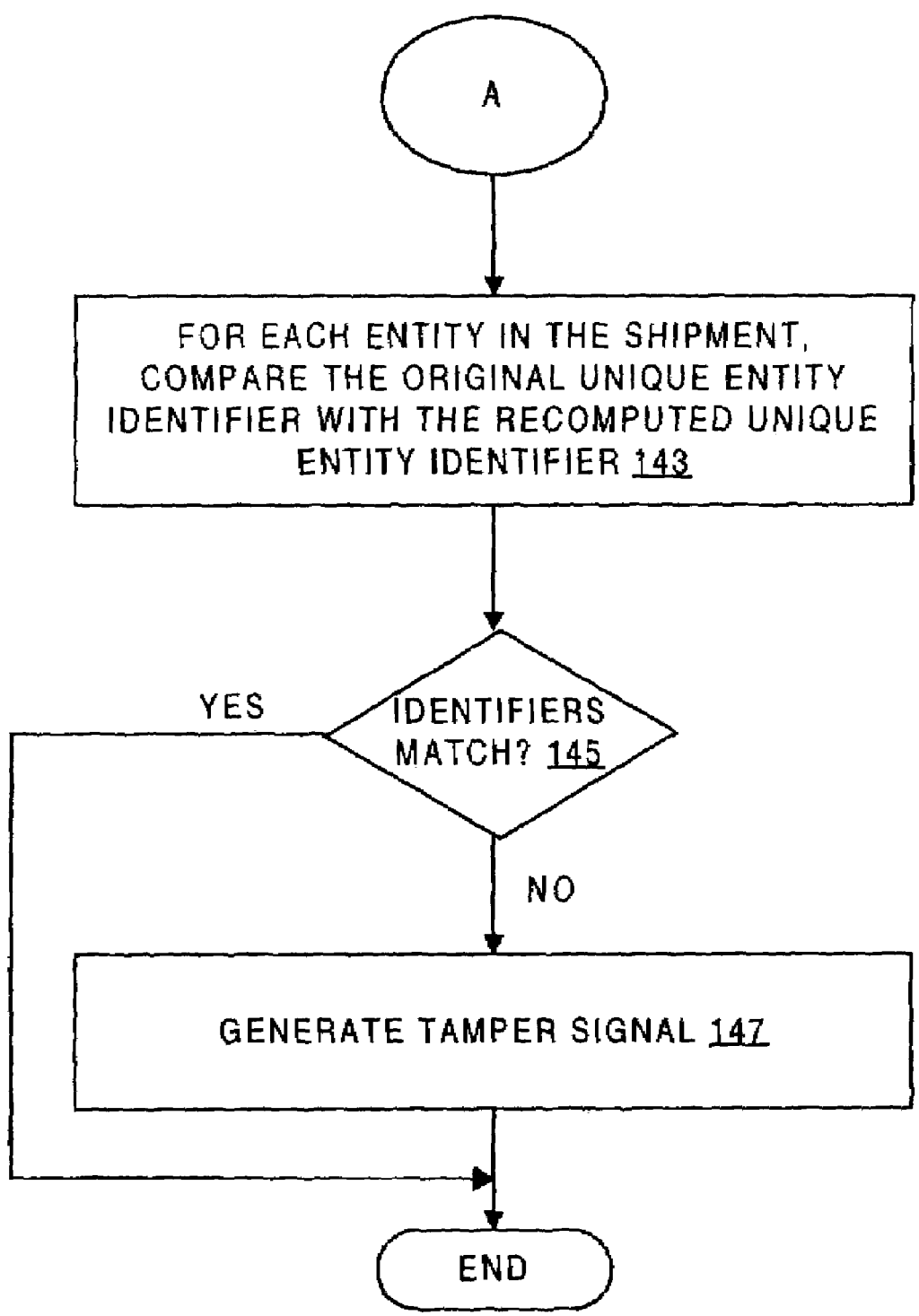

More specifically, a methodology used with the present invention that can implement system 10 includes the steps, shown in FIGS. 2A-2B, of characterizing a shipment to a determine characterization parameter (method step 131) and generating a unique entity identifier for each entity in the shipment using the characterization parameter (method step 133). The method next includes the step of associating the unique entity identifier with the entity (method step 135). The method next includes the steps of electronically associating the unique entity identifier with the shipment and creating a unique shipment identifier (method step 137). The method next includes the steps of sending and receiving the shipment along with the unique shipment identifier, the unique entity identifier, and the digital characterization parameter (method step 139). The method next includes the step of recomputing the unique entity identifier for each entity according to the unique shipment identifier and the digital characterization parameter (method step 141). For each entity in the shipment, or for the shipment, the method next includes the step of comparing the unique entity identifier with the recomputed unique entity identifier (method step 143). If the unique entity identifier is not substantially identical to the recomputed unique entity identifier (decision step 145), a pre-selected characterization notification is generated (method step 147). If the identifiers are substantially identical, there is an indication that tampering of the shipped goods has not occurred.

The method of the present invention can be, in whole or in part, implemented electronically. Signals representing actions taken by elements of the system can travel over electronic communications media. Control and data information can be electronically executed and stored on computer-readable media. The system can be implemented to execute on a node in a computer network. Common forms of computer-readable media include, for example, a floppy disks, flexible disks, hard disks, magnetic tapes, or any other magnetic media, CDROMs or any other optical media, punched cards, paper tape, or any other physical media with patterns of holes, RAMs, PROMs, EPROMs, FLASH-EPROMs, or any other memory chip or cartridge, carrier waves, smart cards, compact flash cards, flash memory, or any other media from which a computer can read.

Figure 3A:
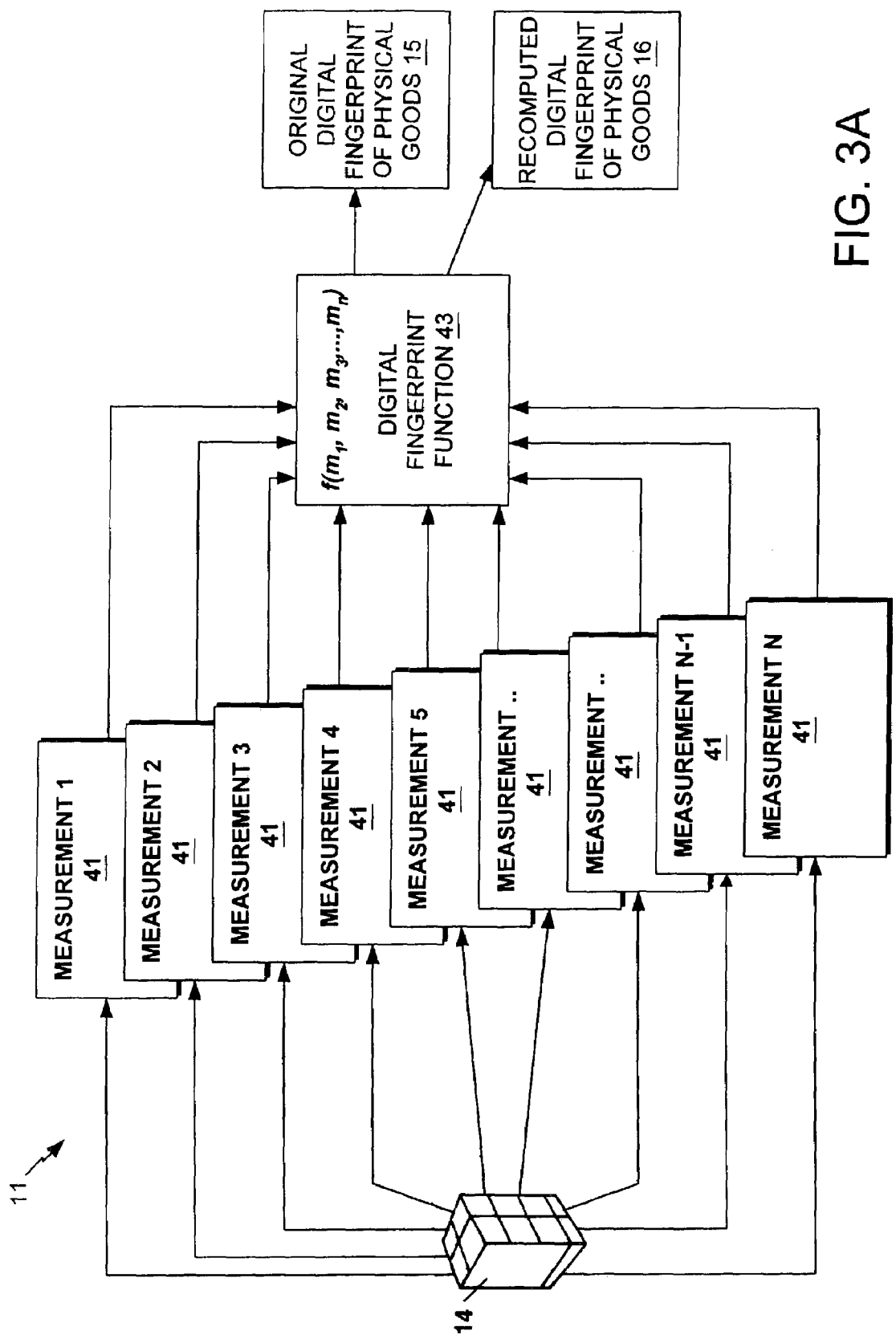
FIG. 3A is a schematic block diagram of the illustrative embodiment of the digital characteristics subsystem of this system in which physical characteristics are measured and used to create the digital fingerprint of the objects.

Referring now to FIG. 3A, digital characterization subsystem 11, for example by means of a variable-length digital fingerprint of n-ary (e.g. binary) digits, produces, without manual intervention and without intrusion to the entity, a digital fingerprint. Original digital fingerprint 15 and recomputed digital fingerprint 16 may be generated by measuring the physical characteristics of the entity 14 at different times and producing a digital code through use of digital fingerprint function 43 that is related to the physical characteristics of the entity 14. Possible physical characteristics that could be measured include, but are not limited to, chemical characteristics, biological characteristics, nuclear and radioactivity characteristics, magnetic field characteristics, electromagnetic wave emission characteristics (passive emission characteristics), optical imagery, X-ray imagery, infrared imagery, smell analysis, weight, volume, pressure, and density. The number and type of measurements 41 to be used could be determined by such factors as business domain, application domain, level of assurance required, and cost.

Figure 3B:
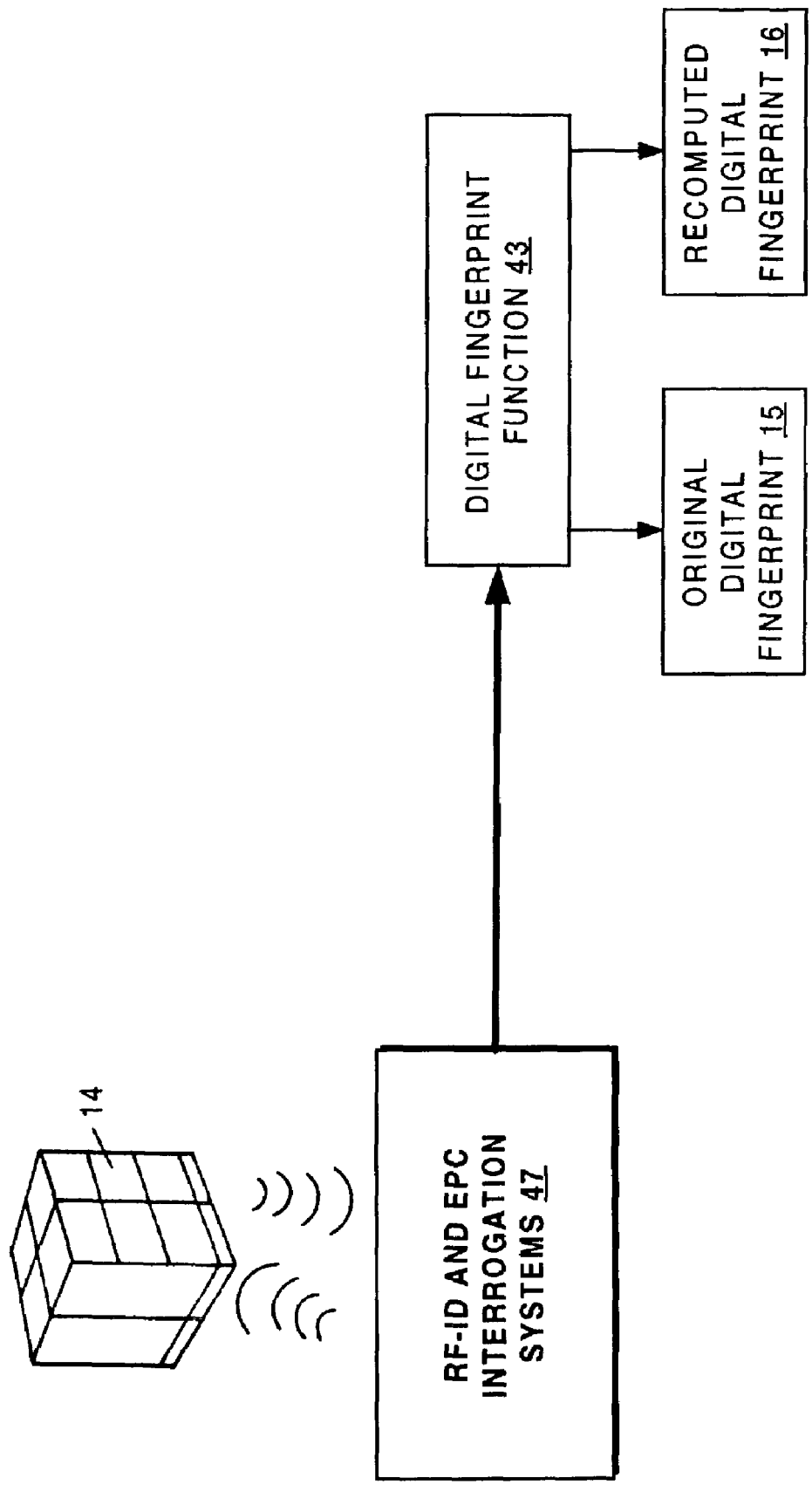
FIG. 3B is a schematic block diagram of alternate embodiment of the digital characteristics subsystem of this invention in which an RFID system is used to tag the objects and access the tags to create the digital fingerprint of the objects.

Referring now to FIG. 3B, in an alternate embodiment of digital characteristics subsystem 11 (FIG. 1), the original digital fingerprint 15 and recomputed digital fingerprint 16 may also be generated by accessing the entity 14's electronic characterization created uniquely for the entity 14, for example by the use of Radio Frequency Identification (RFID or RF-ID) technology. The original digital fingerprint 15 may be generated in any way and is not limited to either physical measurements and RFID technology. Conventional RFID system 47 enables entity 14 or shipment 12 to be tagged with information about its contents using a conventional tag known as an Electronic Product Code (ePC) tag. An ePC tag, which is similar to a Universal Product Code (UPC) tag, is generated based on the contents of the package it labels, not on the type of product that is labeled. For example, a UPC is generated for all boxes of No. 2 pencils from a particular manufacturer, whereas each ePC is unique to the box of goods that it labels. The box can contain any assortment of goods from any manufacturer. ePC tags, such as those described in *Idiot's guide*, http://www.autoidcenter.org/aboutthetech_idiotsguide.asp, contain a unique ePC. The ePC is stored in the tag's microchip which, at 400 microns square, is smaller than a grain of sand. The tag also includes a tiny radio antenna. These tags allow entities to be automatically identified, counted and tracked. A conventional radio frequency scanner known as an interrogator such as, for example, the interrogator included in a Matrics™ RFID system, enables the determination of the contents of the entity without intrusion into the entity. An interrogator, also known herein as an RFID reader, positioned near the entities or shipments, sends radio waves towards the smart tags, powering them. The tags broadcast their individual ePCs. At any subsequent destination, when the shipments arrive, RFID readers identify the shipments and contents without need of opening packages and examining contents. More importantly, subsequent destinations can determine quickly and non-intrusively whether a shipment has been tampered with, either accidentally or intentionally.

Continuing to refer to FIG. 3B, no matter how the ePC tag becomes affixed to the object, an overseer oversees the packing of the objects. The objects are, for example, placed in a tamper-evident container. After packaging is complete, the overseer uses the electronic interrogator to generate a manifest and to generate an original digital fingerprint 15, that is, the information needed to verify whether the package has been tampered with.

Figure 4A:
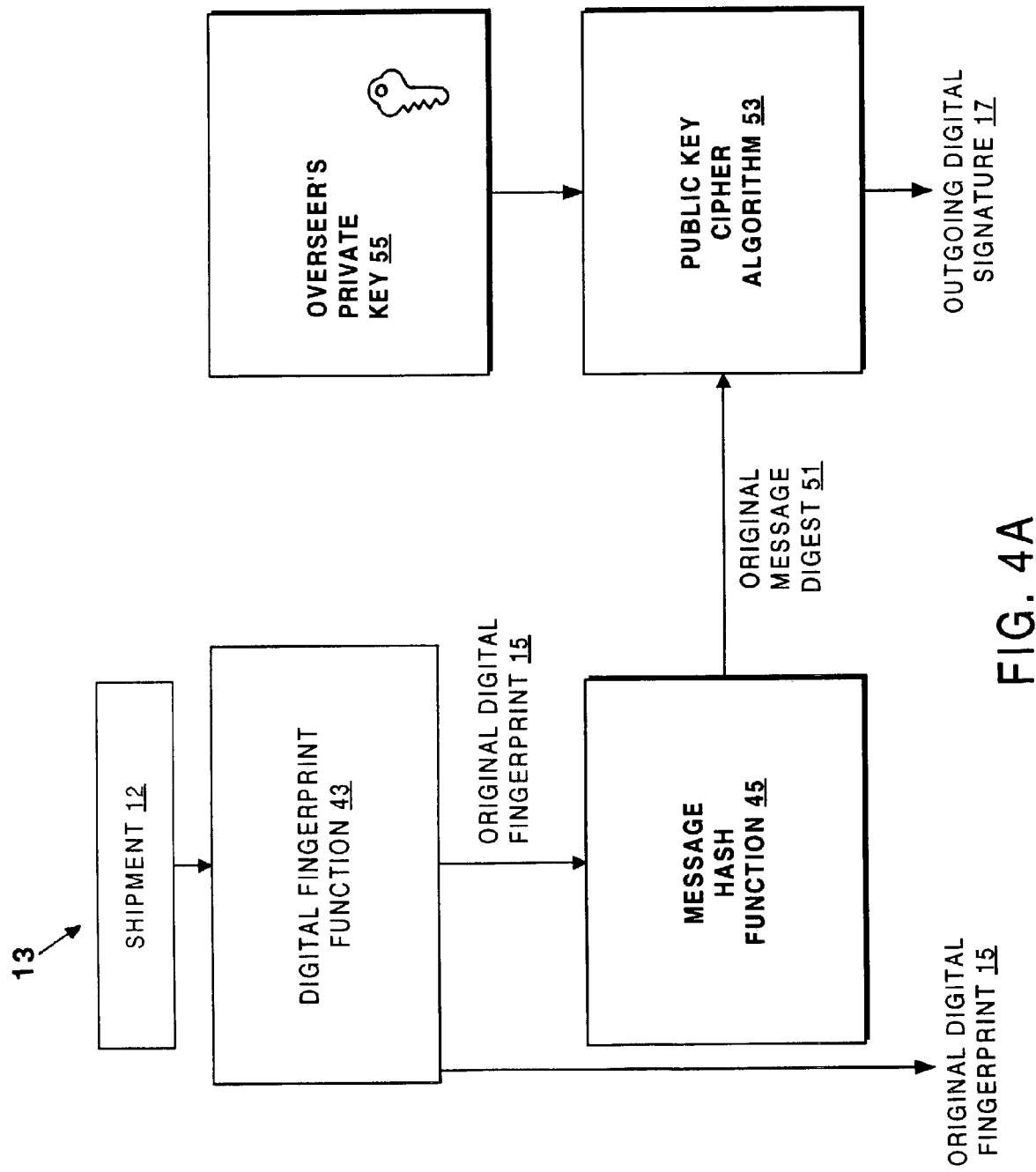
FIG. 4A is a schematic block diagram of the illustrative embodiment of the optional digital signature subsystem in which the outgoing digital signature is prepared.

Optionally, and now referring to FIG. 4A, digital signature subsystem 13 is capable of allowing cryptographic signature, for example by use of a private key to append a digital signature to the digital fingerprint. With a private key and conventional software, digital signatures can be put on documents and other data. A digital signature, difficult to forge, assures that any changes made to the information that has been signed cannot go undetected. To enable the "signing" of a document, digital signature subsystem 13 hashes information, such as the name of the signatory, the authority of the signatory, the date, etc., into a message digest. Digital signature subsystem 13 then encrypts the message digest with the private key. The result is the digital signature which is appended to the digital characterization. Later, digital signature subsystem 13 decrypts the signature using a public key. If the decryption succeeds, then the signature is verified since only the original signatory has the private key. A further security measure is a digital certificate which provides some information about the private key holder. The digital certificate accompanies the digital signature.

Figure 4B:
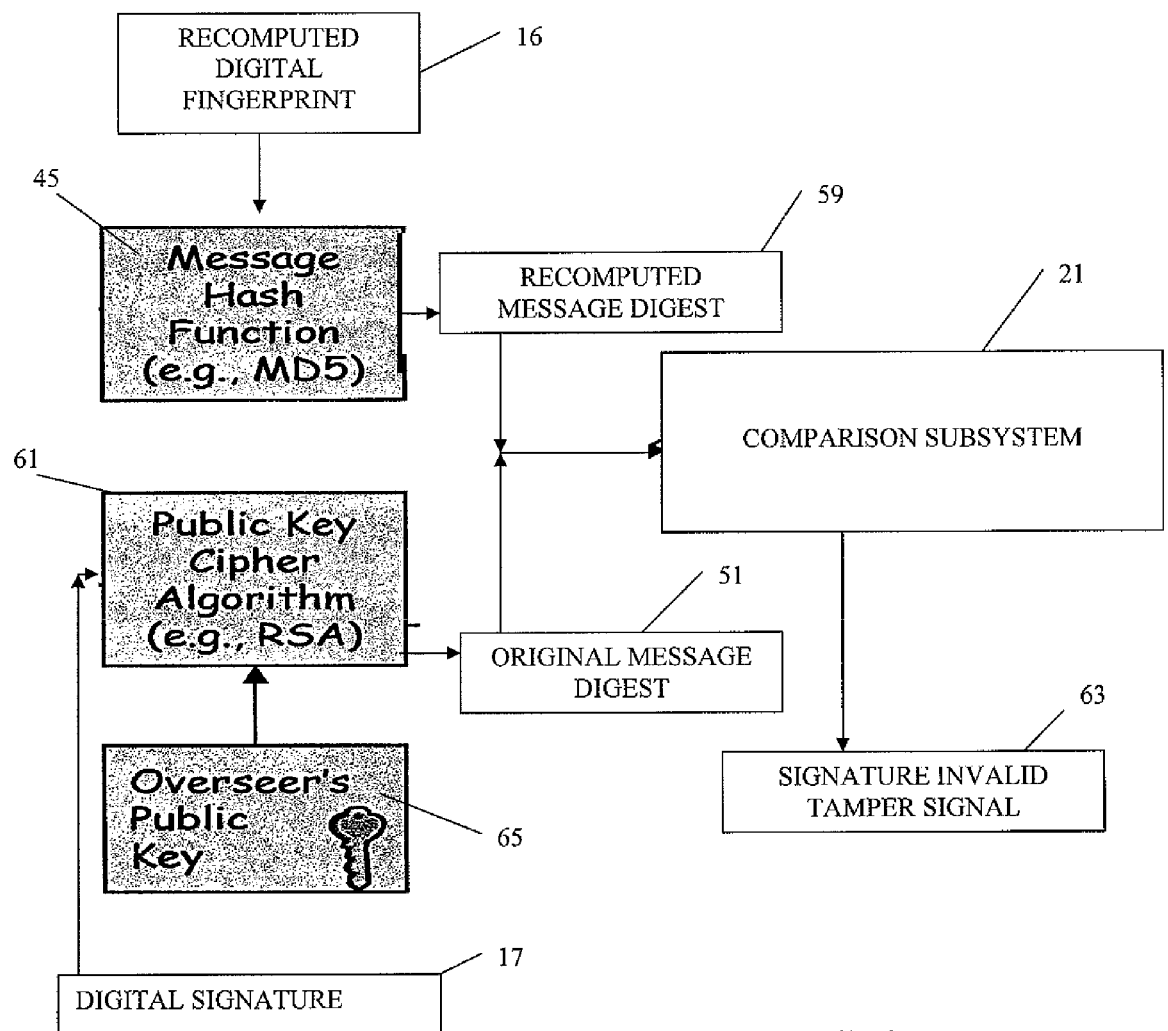
FIG. 4B is a schematic block diagram of the illustrative embodiment of the optional digital signature subsystem in which the incoming digital signature is verified.

A digital signature computed first in time, for example outgoing digital signature 17 (as shown in FIG. 4A), could be associated with shipment 12 as follows. Through the interface between digital characterization subsystem 11 (FIG. 1) and optional digital signature subsystem 13 (FIG. 1), digital fingerprint function 43 (as shown in FIG. 4B) provides original digital fingerprint 15 to message hash function 45, such as, for example, the widely used MD5 cryptographic hash function. In the illustrative embodiment, message hash function 45 is part of digital signature subsystem 13. Message hash function 45 is used to compute original message digest 51 when creating outgoing digital signature 17. Original message digest 51 is provided to a public key cipher algorithm 53 (see FIG. 4A) such as the one provided by RSA® Data Security. Overseer's private key 55 is used to create outgoing digital signature 17 that is specific to original digital fingerprint 15. Together original digital fingerprint 15 and outgoing digital signature 17 can be sent by send subsystem 19 (FIG. 1) with shipment 12 to be received and decoded by receiving subsystem 20 (FIG. 1).

The electronic media for transferring the digital fingerprint and optionally the digital signature can include but are not limited to, for example, physical media and electromagnetic signal media. Physical media can include, but are not limited to, floppy disks, flexible disks, hard disks, magnetic tape, or any other magnetic media, compact disks or any other optical media, punched cards, paper tape, or any other physical media with patterns of holes, rapid access memories, programmable rapid access memories, editable programmable read only memories (EPROMs), FLASH-EPROMs, or any other memory chip or cartridge, smart cards, compact flash cards, flash memory, or any physically-removable media which a computer can read. Electronic signal media can include, but are not limited to, for example, the internet, a wireless local area network, a local area network, a wide area network, a carrier wave, or any other medium from which a computer can access data electronically. For intentional tampering situations, a conventional secure electronic signal medium can be used, for example, but not limited to, a secure internet connection, a secure wireless local area network, a secure local area network, a secure wide area network, a secure carrier wave, or any other secure medium from which a computer can access secure data electronically.

Referring now to FIG. 4B, at the point of border or reception inspections, or during (subsequent to digital characterization and perhaps signature) in-place inspections, accidental or intentional alteration can be determined as follows. In the case of accidental alteration, first an inspector determines if shipment 12 has been physically altered. If not, the inspector interrogates shipment 12, perhaps electronically as described above using RFID technology, to determine its contents. Digital characterization subsystem 11 (FIGS. 1 and 3A) prepares, from the data collected by the electronic interrogator, recomputed digital fingerprint 16. Recomputed digital fingerprint 16 is supplied to digital signature subsystem 13 (FIG. 1) which, in the illustrative embodiment, includes message hash function 45. Message hash function 45 supplies recomputed message digest 59 to comparison subsystem 21 (also see FIGS. 1 and 4B) while public key cipher algorithm 53 (shown in FIG. 4A), after overseer's public key 65 is applied, provides original message digest 51 to comparison subsystem 21. Comparison subsystem 21 compares original message digest 51 to recomputed message digest 59 and invokes alteration handling subsystem 23 (FIG. 1) which generates a pre-selected characterization signal, for example such as tamper signal 63, if the comparison fails. The pre-selected characterization signal can alert a local operator who is checking the goods or accepting a new shipment of goods that a possible tampering has taken place. The pre-selected characterization signal can also be transmitted electronically to a remote operator to provide the same kind of alert. The system does not limit the structure of the pre-selected characterization signal.

Figure 4C:
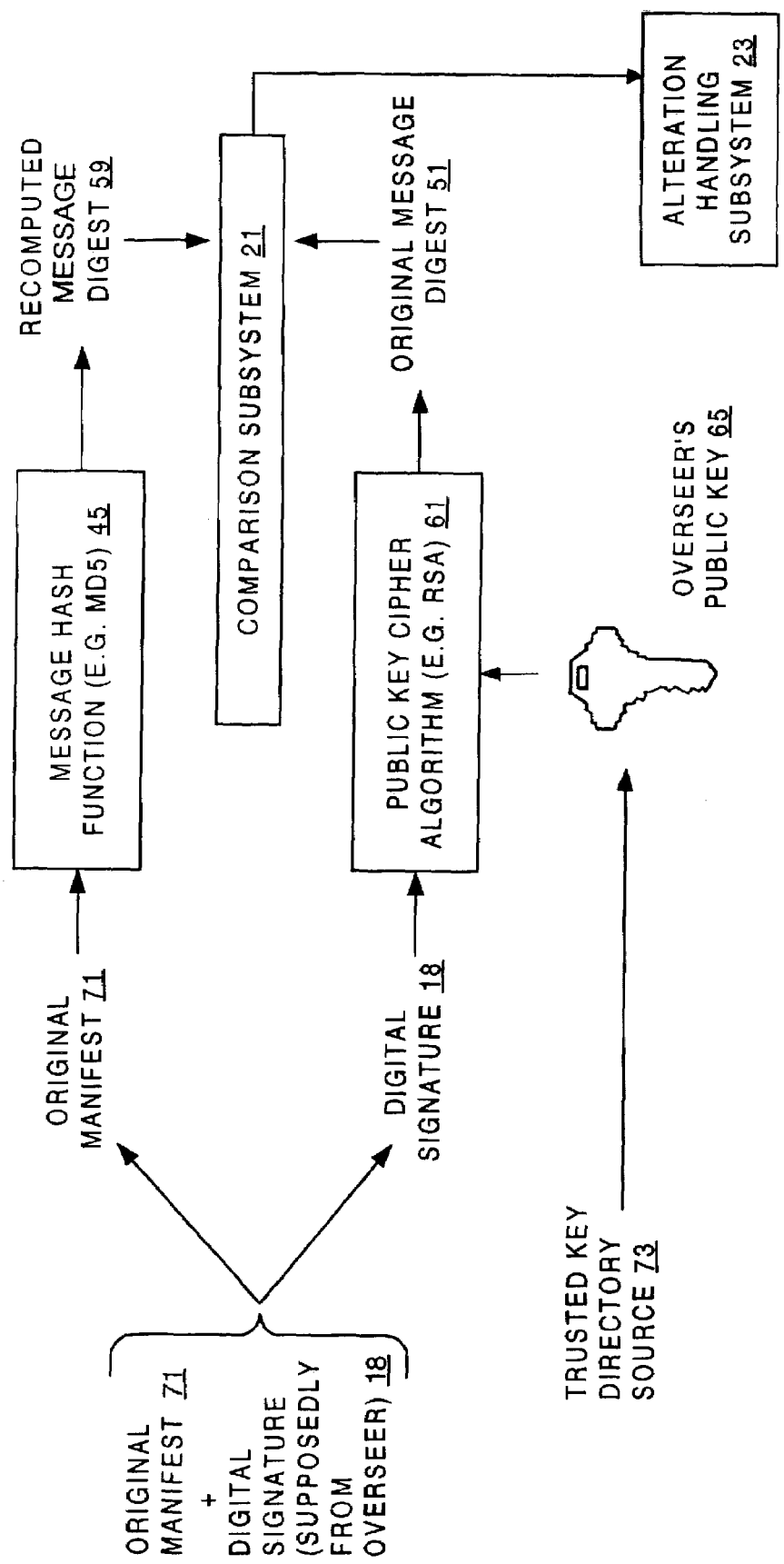
FIG. 4C schematic block diagram of the illustrative embodiment of the operational use of the comparison subsystem and the alteration handling subsystem.

Referring now to FIG. 4C, alternative to the method of FIG. 4B, the contents of shipment 12 (FIG. 1) can be compared to an original manifest 71. If the contents of shipment 12 are substantially identical to the original manifest 71, and the original manifest 71 was shipped by a trusted overseer (i.e. digital signature validated), then shipment 12 passes inspection. In particular, digital characterization subsystem 11 (FIG. 1) or receive subsystem 20 (FIG. 1) receives original manifest 71 and incoming digital signature 18. Message hash function 45 prepares recomputed message digest 59 from original manifest 71 and supplies it to comparison subsystem 21 while public key cipher algorithm 53, after supplied with overseer's public key 65, computes original message digest 51 from incoming digital signature 18 and supplies it to comparison subsystem 21. Overseer's public key 65 is chosen from a trusted key directory source 73. Comparison subsystem 21 compares original message digest 51 to recomputed message digest 59 and invokes alteration handling subsystem 23 which generates pre-selected signature signal which could, for example, alert authorities of tampering if the comparison fails.

Figure 5:
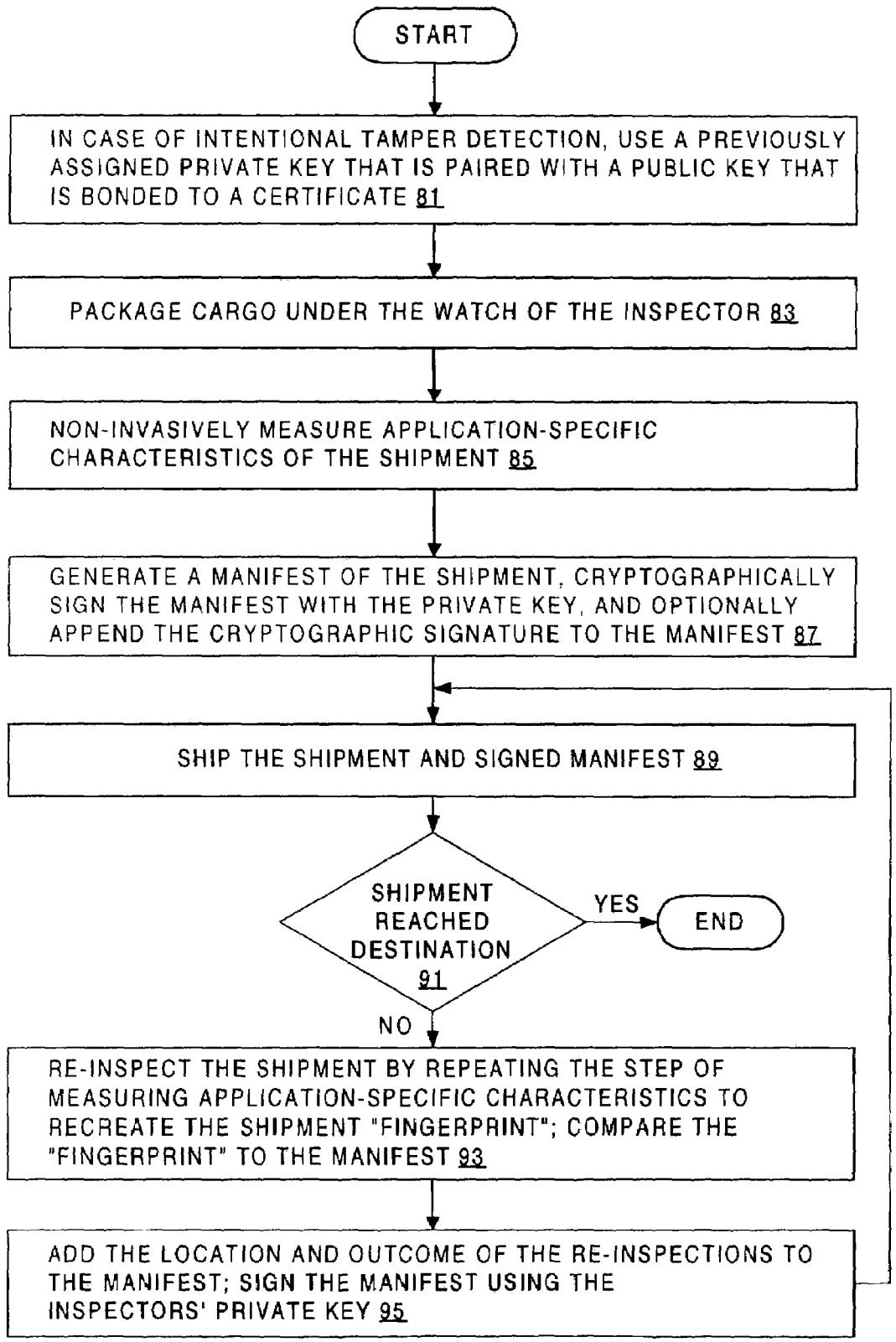
FIG. 5 is a flowchart of the method of the illustrative embodiment of the present invention in which non-invasive interrogation technology and electronic signature technology are used together.

Referring now to FIG. 5, the method of an alternate illustrative embodiment, in which non-invasive characteristics measurement is combined with the manifest system of FIG. 4C, includes the steps of, in the case of intentional tamper detection, assigning each inspector a private key, pairing the private key with a public key, and bonding the public key to a certificate (method step 81). The public key and certificate are commonly available to other inspectors, typically via a Public Key Infrastructure (PKI). They key materials are standard format RSA or other standard public key (a.k.a. asymmetric) encryption materials. For either intentional or accidental tamper detection, the method further includes the step of packaging cargo under the watch of the inspector (method step 83). The inspector is most likely under the employ of a customs agency (in the case of border inspection application) or security screening agency (in the case of airport baggage inspection application), but could even be employed by a trusted third party (such as certified auditors). The inspector represents an important part of this concept, as he/she is trusted to properly inspect the shipment. The method includes a next step of non-invasive measuring of application-specific characteristics of the shipment (method step 85). The characteristics measured are dependent upon the application, but are expected to be standard across a particular industry. It is possible for a border inspection area to have only a subset of these measurement capabilities. The method includes a next step of generating a manifest of the shipment, cryptographically signing the manifest, and appending the cryptographic signature to the manifest (method step 87). These steps can be taken during or after the packaging process, and are usually done by the inspector. In the case of intentional tamper detection, the private key (probably stored securely on a smart card or other standard security token) is used to cryptographically sign the manifest. This cryptographic signature is generated using conventional standards-based digital signature technology. The result of generating the manifest is a digital "fingerprint" of the shipment using Tamper-Detection Codes (TDC) and Error-Detection Codes (EDC) which automatically detect alterations to physical goods with a high-level of confidence. The digital manifest document can be, but isn't required to be, based on XML with a specific Data Type Definition, or any document structure that can accommodate partial re-inspections. An ideal fingerprint is unique to the shipment, and changes if the shipment is tampered with. The closer any fingerprinting method comes to this ideal, the higher the security assurance of the inspection process. The method could next include the step of shipping the shipment and the manifest (method step 89). If, after the step of shipping, the shipment arrives at an intermediate stopping point (decision step 91), or if there was just a lapse of time with no shipping involved, the method next includes the step of re-inspecting, possibly at the final destination, the shipment by repeating the steps of measuring application-specific characteristics to recreate the shipment "fingerprint" and comparing the "fingerprint" to the manifest (method step 93). The signature is verified before the original and recreated fingerprints are compared. The method next includes the steps of adding the location and outcome of the re-inspections to the manifest and optionally signing the manifest using the inspectors' private keys to produce an audit trail (method step 95).

Although the invention has been described with respect to an illustrative embodiment, it should be realized this invention is also capable of a wide variety of further and other embodiments within the spirit and scope of the appended claims.

What is claimed is:

1. A system for detecting if an object has been tampered with comprising:
    a characterizer configured to generate a first digital characterization of an object at a first time, said characterizer generating at least one subsequent digital characterization of the object at a subsequent time;
    a comparator configured to receive and compare said first digital characterization with said second digital characterization, said comparator further configured to determine whether said first digital characterization is substantially different from said second digital characterization and generating a pre-selected characterization notification when said second digital characterization has substantially changed compared to said first digital characterization;
    an indicator configured to receive said pre-selected characterization notification, said indicator providing a pre-selected characterization signal, and
    a signer configured to provide a first cryptographic signature associated with said first digital characterization and a second cryptographic signature associated with said second digital characterization to said comparator,
    wherein said comparator is configured to generate a pre-selected signature characterization when said second cryptographic signature is not substantially identical to said first cryptographic signature,
    wherein said indicator is configured to receive said pre-selected signature notification, and provide a pre-selected signature signal.

2. The system as defined in claim 1 wherein said first digital characterization is computed non-invasively with respect to the object at the first time, and wherein said second digital characterization is computed non-invasively with respect to the object at the at least one subsequent time.

3. The system as defined in claim 1 wherein the first time is the time at which the object is transported from a shipping origination point, the at least one subsequent time is selected from the group consisting of a pre-selected time, a random time, a border crossing, and the time at which the object reaches a shipping destination point.

4. The system as defined in claim 1 wherein said first digital characterization is computed by measuring a set of physical characteristics of the object at the first time, and wherein said at least one subsequent digital characterization is computed by measuring said set of physical characteristics of the object at the at least one subsequent time.

5. The system as defined in claim 4 wherein said set of physical characteristics is selected from a group consisting of chemical characteristics, biological characteristics, nuclear characteristics, radioactive characteristics, magnetic field characteristics, electromagnetic wave emission characteristics, optical imagery, X-ray imagery, infrared imagery, smell analysis, weight, volume, pressure, and density.

6. An alteration detection system for at least one object comprising:
    a digital characterization subsystem configured to prepare an original unique characterization for at least one object at a first time, said digital characterization subsystem configured to prepare a recomputed unique characterization for said at least one object at at least one subsequent time;
    a comparison subsystem configured to compare said original unique characterization to said recomputed unique characterization;
    an alteration handling subsystem configured to prepare a pre-selected characterization signal if said original unique characterization is not substantially identical to said recomputed unique characterization; and
    a digital signature subsystem configured to provide to said comparison subsystem a first cryptographic signature associated with said original unique characterization and a second cryptographic signature associated with said recomputed unique characterization,
    wherein said comparison subsystem is configured to compare said first cryptographic signature with said second cryptographic signature,
    wherein said alteration handling subsystem is configured to generate a pre-selected signature signal if said first cryptographic signature is not substantially identical to said second cryptographic signature.

7. The alteration detection system as defined in claim 6 wherein said original unique characterization is computed non-invasively with respect to said at least said one object, and wherein said recomputed unique characterization is computed non-invasively with respect to said at least one object.

8. The alteration detection system as defined in claim 6 wherein said original unique characterization is computed by measuring a set of physical characteristics of said at least one object, and wherein said recomputed unique characterization is computed by measuring said set of physical characteristics of said at least one object.

9. A method for detecting alteration of an object comprising the steps of:
    characterizing the object to determine a characterization parameter;
    generating, using the characterization parameter, an original unique entity identifier for the object at a first time;
    associating the original unique entity identifier with the object;
    generating a recomputed unique entity identifier, according to the characterization parameter, for the object at at least one subsequent time;
    generating a pre-selected characterization notification if the original unique entity identifier is not substantially identical to the recomputed unique entity identifier;
    generating, at the first time, a cryptographic signature associated with the original unique entity identifier;
    verifying, at the at least one subsequent time, the cryptographic signature; and preparing a pre-selected signature notification if the cryptographic signature does not verify.

10. The method as defined in claim 9 further comprising the steps of:
    associating the original unique entity identifier with a shipment;
    sending the original unique entity identifier and the characterization parameter in association with the shipment; and
    receiving the original unique entity identifier and the characterization parameter in association with the shipment.

11. The method as defined in claim 10 further comprising the steps of:
    characterizing the shipment to determine a shipment characterization parameter;
    generating, using the shipment characterization parameter, a shipment original unique entity identifier for the shipment at a first time;
    associating the original unique entity identifier with the shipment;
    generating a recomputed shipment unique entity identifier, according to the shipment characterization parameter, for the shipment at at least one subsequent time; and
    generating the pre-s elected characterization notification if the shipment original unique entity identifier is not substantially identical to the recomputed shipment unique entity identifier.

12. The method as defined in claim 10 wherein said step of sending further comprises the steps of:
    selecting an electronic signal medium from a group consisting of the internet, a wireless local area network, a local area network, a wide area network, and a carrier wave; and
    transmitting the original unique entity identifier through the electronic signal medium.

13. The method as defined in claim 12 wherein said step of receiving further comprises the steps of:
    receiving an electronic signal from the electronic signal medium; and
    reading the original unique entity identifier from the electronic signal.

14. The method as defined in claim 10 wherein said step of sending further comprises the steps of:
    selecting a secure electronic signal medium from a group consisting of a secure internet connection, a secure wireless local area network, a secure local area network, a secure wide area network, and a secure carrier wave; and
    transmitting the original unique entity identifier through the secure electronic signal medium.

15. The method as defined in claim 9 wherein said step of generating the original unique entity identifier further comprises the steps of:
    non-invasively measuring physical characteristics of the object; and
    preparing the original unique entity identifier based on measured physical characteristics.

16. A node for carrying out the method according to claim 9.

17. The method as defined in claim 9 wherein said detecting alteration of an object is performed by a computer system receiving a carrier wave from a computer network, the carrier wave configured to carry information for executing said detecting alteration of an object.

* * * * *

UNITED STATES PATENT AND TRADEMARK OFFICE
CERTIFICATE OF CORRECTION

PATENT NO. : 7,415,613 B2  Page 1 of 1
APPLICATION NO. : 10/444379
DATED : August 19, 2008
INVENTOR(S) : Jeremy D. Impson et al.

It is certified that error appears in the above-identified patent and that said Letters Patent is hereby corrected as shown below:

Claim 11 (Col. 11, Line 24) should read -- pre-selected -- and not "pre-s elected"

Signed and Sealed this

Seventh Day of October, 2008

JON W. DUDAS
*Director of the United States Patent and Trademark Office*